US012678752B2

(12) United States Patent
Beebe

(10) Patent No.: US 12,678,752 B2
(45) Date of Patent: Jul. 14, 2026

(54) NUT BUTTER MIXING APPARATUS

(71) Applicant: Clark Andrew Beebe, Longmont, CO (US)

(72) Inventor: Clark Andrew Beebe, Longmont, CO (US)

(*) Notice: Subject to any disclaimer, the term of this patent is extended or adjusted under 35 U.S.C. 154(b) by 439 days.

(21) Appl. No.: 18/476,999

(22) Filed: Sep. 28, 2023

(65) Prior Publication Data

US 2025/0108346 A1 Apr. 3, 2025

(51) Int. Cl.

| | |
|---|---|
| ***B01F 31/20*** | (2022.01) |
| ***B01F 35/32*** | (2022.01) |
| ***B01F 35/33*** | (2022.01) |
| *B01F 101/06* | (2022.01) |

(52) U.S. Cl.

CPC ............ *B01F 31/26* (2022.01); *B01F 35/325* (2022.01); *B01F 35/33* (2022.01); *B01F 2101/06* (2022.01)

(58) Field of Classification Search

CPC ........ B01F 31/26; B01F 31/25; B01F 31/265; B01F 35/325; B01F 2101/06

See application file for complete search history.

(56) References Cited

U.S. PATENT DOCUMENTS

| | | | | |
|---|---|---|---|---|
| 523,587 A * | 7/1894 | Muller | A23C 15/02 | 366/208 |
| 584,549 A * | 6/1897 | Hutchinson | B01F 35/423 | 248/128 |
| 791,664 A * | 6/1905 | Wilson | B01F 35/423 | 366/209 |
| 2,286,600 A * | 6/1942 | Chott | A61C 5/68 | 366/602 |
| 2,755,173 A * | 7/1956 | Shore | G01N 33/48 | 73/53.01 |
| 3,503,592 A * | 3/1970 | Taylor | B01F 35/422 | 366/274 |
| 6,367,963 B2 | 4/2002 | Sanpei et al. | | |
| 6,595,680 B2 | 7/2003 | Sanpei et al. | | |
| 9,907,319 B2 | 3/2018 | Biglari et al. | | |
| 10,076,124 B2 | 9/2018 | Biglari et al. | | |
| 10,792,629 B2 | 10/2020 | Venables | | |
| 2014/0126321 A1* | 5/2014 | Eisen | B01F 35/22161 | 366/213 |

(Continued)

FOREIGN PATENT DOCUMENTS

EP 3002056 B1 * 2/2020 ............... G01N 1/02

*Primary Examiner* — Marc C Howell

(57) ABSTRACT

A nut butter mixing apparatus includes a base, a rotary drive unit, a rocking assembly, a holder, a first stabilizer, a second stabilizer, a transmission unit, a first rotational mechanism, and a second rotational mechanism. The rocking assembly is moveably mounted to the base by the first stabilizer and the second stabilizer. The rotary drive unit is rotationally engaged in between a left rail and a right rail of the rocking assembly through the base, wherein the rotary drive radially moves the rocking assembly. The holder is rotatably mounted to the rocking assembly. The first rotational mechanism is operatively coupled to the rotary drive unit through the transmission unit, wherein the first rotational mechanism rotates the holder. The second rotational mechanism is operatively coupled to the rotary drive through the transmission unit, wherein the second rotational mechanism angularly moves the rocking assembly.

14 Claims, 13 Drawing Sheets

(56) References Cited

U.S. PATENT DOCUMENTS

| | | | | |
|---|---|---|---|---|
| 2017/0173544 | A1 | 6/2017 | Laby | |
| 2019/0143284 | A1* | 5/2019 | Lee | C12M 41/32 435/298.1 |

* cited by examiner

NUT BUTTER MIXING APPARATUS

FIELD OF THE INVENTION

The present invention relates generally to a mixing apparatus. More specifically, the present invention is a nut butter mixing apparatus so that a nut butter storage container can be rotated in three different direction to resolve solid and oil separation.

BACKGROUND OF THE INVENTION

Nut butter is consumed in many countries as an ingredient or a meal. Typically, cashew butter, almond butter, peanut butter, or any other type of edible spreads that are made from tree nut are considered a nut butter. Within the culinary industry, Peanut butter is also known as nut butter even though peanuts are not considered as a type of tree nut. Peanut butter is a food paste or spread made from ground, dry-roasted peanuts. Peanut butter is a nutrient-rich food containing high levels of protein, several vitamins, and dietary minerals. It is typically served as a spread on bread, toast, or crackers, and used to make sandwiches (notably the peanut butter and jelly sandwich). It is also used in a number of breakfast dishes and desserts, such as granola, smoothies, crepes, cookies, brownies, or croissants. Since natural peanut butter is generally made without the use of added stabilizers (such as, hydrogenated oil), the peanuts' natural oils separates from the solid and rise to the top of the jar. As a result, users normally have to mix the separated oil into the solid before consuming. Due to the consistency of the solid, the mixing process can sometimes be difficult and time consuming thus creating an unnecessary step.

It is therefore an objective of the present invention to provide a nut butter mixing apparatus so that the users can easily mix the separated oil into the solid before consuming. The present invention implements side-to-side movement, up and down movement, and rotational movement to the nut butter jar to accelerate the mixing process. The present invention is designed as an accessory unit for industry standard blenders or food processors as the rotational energy output of the industry standard blender/food processor is utilized to power the present invention.

DETAIL DESCRIPTIONS OF THE INVENTION

Figure 1:
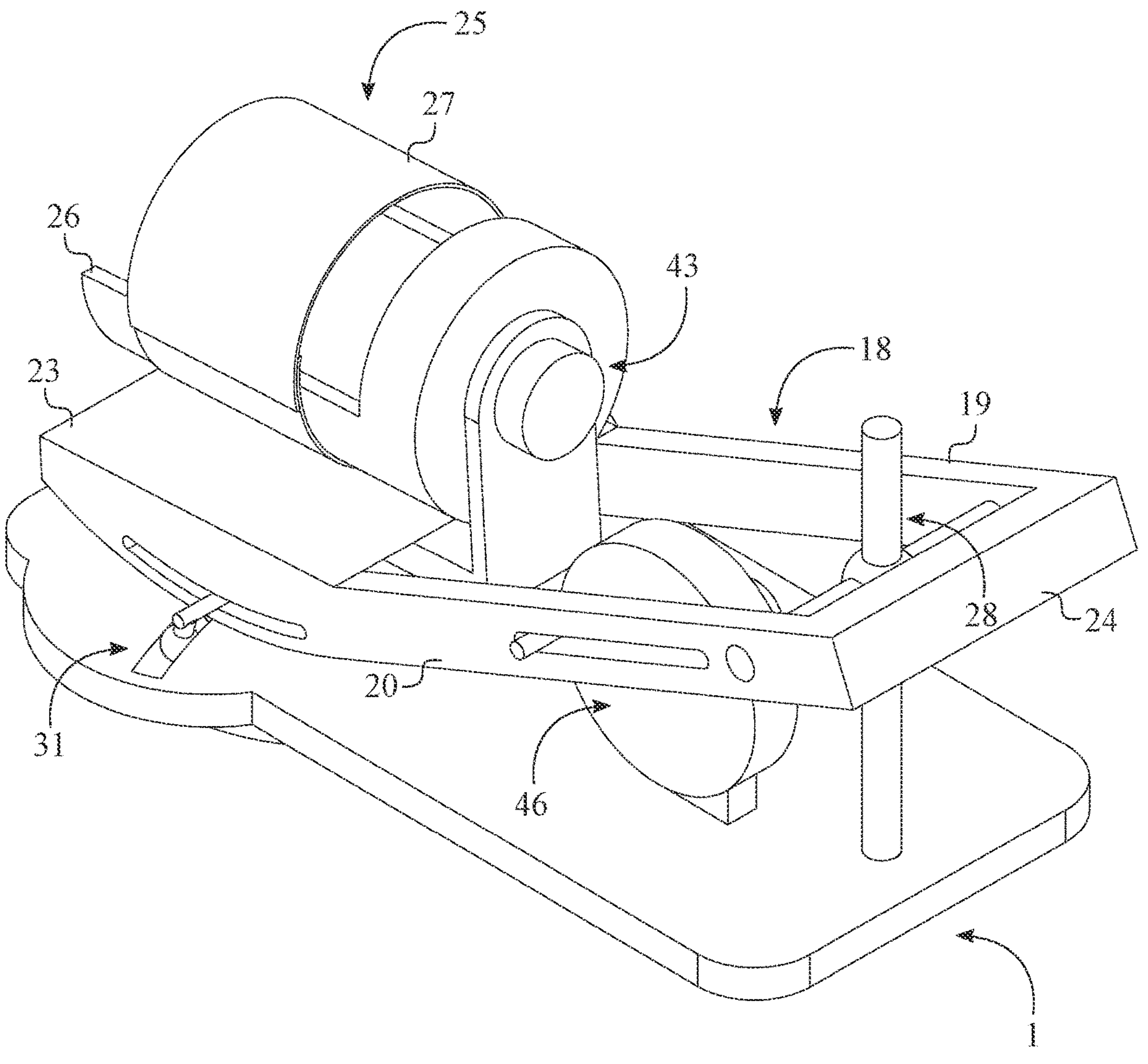
FIG. 1 is a top perspective view of the present invention.
Figure 2:
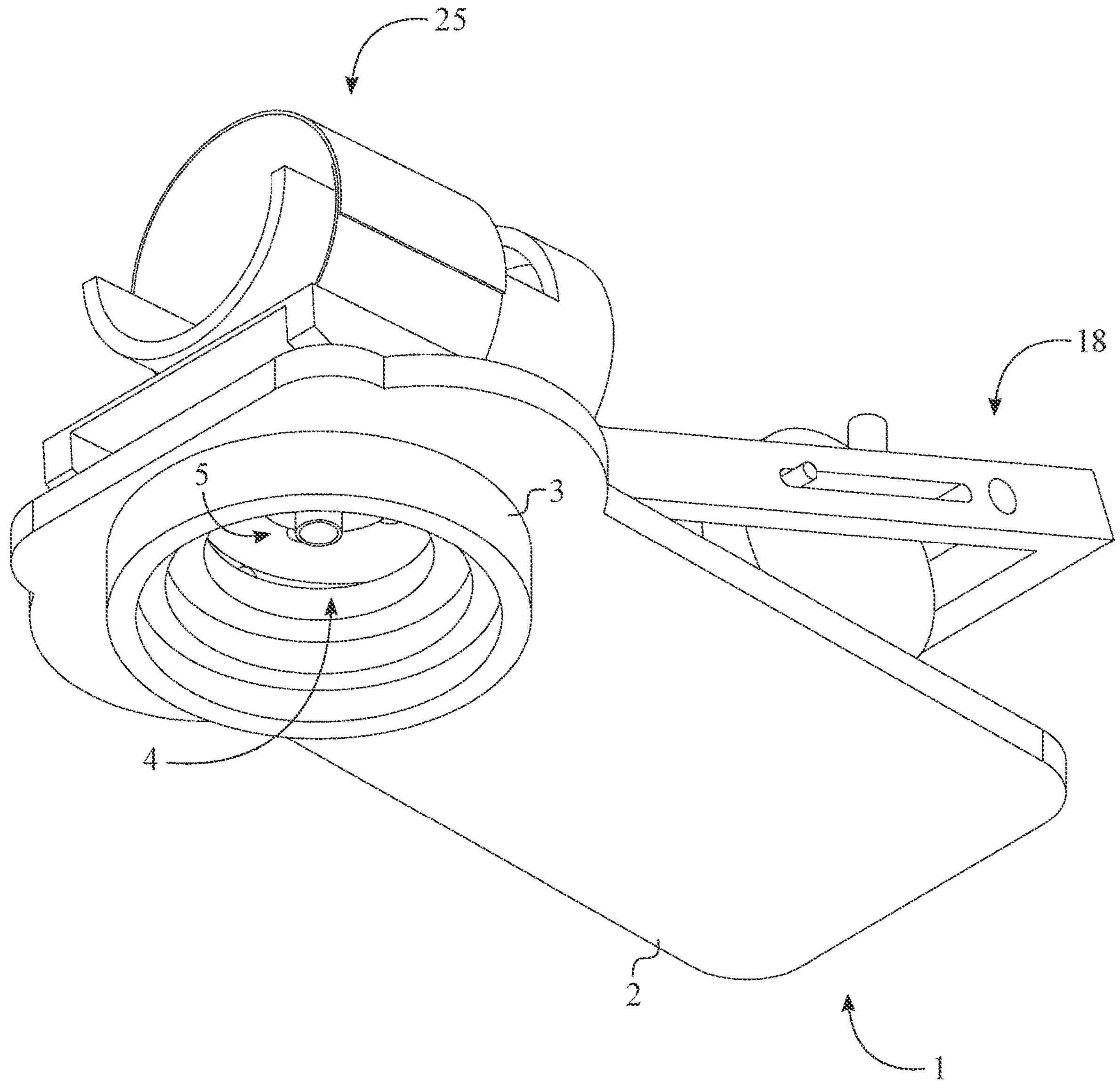
FIG. 2 is a bottom perspective view of the present invention.
Figure 3:
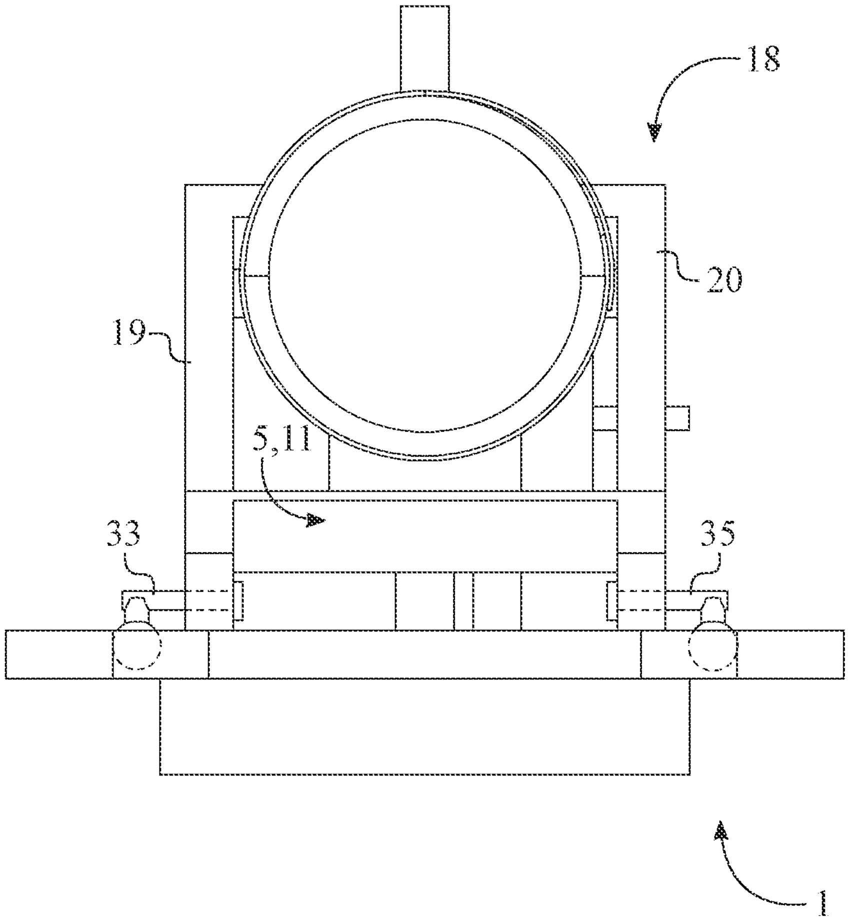
FIG. 3 is a rear view of the present invention.

All illustrations of the drawings are for the purpose of describing selected versions of the present invention and are not intended to limit the scope of the present invention.

The present invention is a nut butter mixing apparatus that the oil and solid separation within a storage container can be resolved. More specifically, the present invention rotates the storage container in three different directions so that the separated oil and the separated solid can be mixed together. The present invention is designed as an accessory unit for industry standard blenders or food processors, wherein the rotational energy output of the industry standard blender/food processor is utilized to power the present invention. The present invention is preferably designed for a peanut butter jar thus allowing the user to attain the ideal texture and consistency for the stored peanut butter. However, the present invention can be utilized to mix any other types of nut butter without deviating from the scope of the functionality. As shown in FIG. 1, FIG. 2, FIG. 12, and FIG. 13, the present invention comprises a base 1, a rotary drive unit 5, a rocking assembly 18, a holder 25, a first stabilizer 28, a second stabilizer 31, a transmission unit 38, a first rotational mechanism 43, and a second rotational mechanism 46.

In reference to the general configuration of the present invention, as shown in FIGS. 1-6, the rocking assembly 18 that provides the side-to-side movement and the up and down movement for the storage container is moveably mounted to the base 1 by the first stabilizer 28 and the second stabilizer 31. The rocking assembly 18 comprises a left rail 19 and a right rail 20 to structurally strengthen the rocking assembly 18 and to secure place the storage container within the present invention. The first stabilizer 28 and the second stabilizer 31 function as the connecting mechanisms that secure the rocking assembly 18 to the base 1. Furthermore, the first stabilizer 28 and the second stabilizer 31 limit the side-to-side and the up and down movements of the rocking assembly 18 to prevent accidental separation of the rocking assembly 18 from the base 1. The holder 25 is rotatably mounted to the rocking assembly 18 so that the storage container can be attached and secured to the holder 25. The rotary drive unit 5 is rotationally engaged in between the left rail 19 and the right rail 20 through the base 1 and functions as the power inputting unit. In other words, the rotary drive unit 5 harness the rotational energy output of the industry standard blender/food processor to achieve three different movements of the present invention. More specifically, the rotary drive unit 5 is able to radially moves (side-to-side movement) the rocking assembly 18 without utilizing the transmission unit 38. The first rotational mechanism 43 is operatively coupled to the rotary drive unit 5 through the transmission unit 38 thus allowing the first rotational mechanism 43 rotates the holder 25 360-degrees around a first axis 51. The second rotational mechanism 46 is operatively coupled to the rotary drive unit 5 through the transmission unit 38 thus allowing the second rotational mechanism 46 angularly moves (up and down movement) the rocking assembly 18 along a second axis 52.

Figure 8:
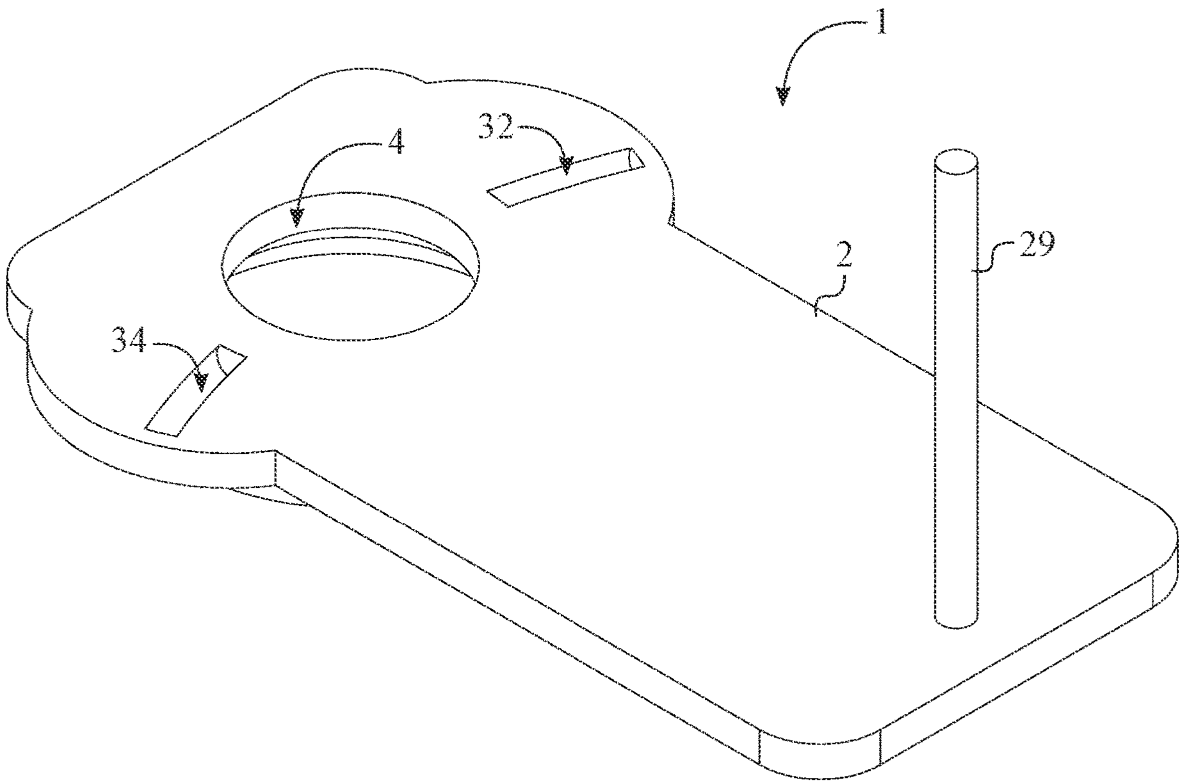
FIG. 8 is a perspective view of the base of the present invention.

The base 1 functions as the stationary body and mounts the present invention to the industry standard blender/food processor. In reference to FIG. 1, FIG. 2, and FIG. 8, the base 1 may comprise a main platform 2, a supporting ring 3, and an opening 4. The main platform 2 is an elongated rigid body so that the rest of the components of the present invention can be configured. The opening 4 traverses through the main platform 2 and allows an output shaft of the industry standard blender/food processor to pass through the main platform 2. The supporting ring 3 functions as an attachment bracket, wherein the supporting ring 3 creates a friction fit with the housing of the industry standard blender/food processor. As a result, the supporting ring 3 is terminally connected to the main platform 2 and concentrically positioned around the opening 4 thus preventing the separation of the main platform 2 from the industry standard blender/food processor. Furthermore, low-friction material such as silicon or rubber can be integrated with the inside surface of the supporting ring 3 to further enhance the friction fit and to reduce vibration between the present invention and the industry standard blender/food processor. Even though the preferred shape of the supporting ring 3 is configured into a circular shape, the support ring 3 can be any other shapes or configured with additional locking features without deviating from the scope of the functionality.

The rotary drive unit 5 is an adjustable drive unit and allows the user to limit the side-to-side movement of the holder 25. Furthermore, the rotary drive unit 5 also facilitate the up and down movement of the holder 25 and the 360 degree rotation of the holder 25 with the assist of the transmission unit 38. In reference to FIG. 2 and FIG. 3, the rotary drive unit 5 may comprise a first eccentric disk 6, a second eccentric disk 11, and a pivoting adaptor 17. The first eccentric disk 6 is removably engaged within the second eccentric disk 11 in such a way that the actual positioning of the first eccentric disk 6 determine the radial movement of the holder 25. In other words, the present invention enables multiple engagement configurations for the first eccentric disk 6 and the second eccentric disk 11 so that the user can determine the limitations of the side-to-side movement. The pivoting adaptor 17 is pivotably connected to the first eccentric disk 6 and traverses through the opening 4 of the base 1. As a result, the pivoting adaptor 17 is able to engage with the output shaft of the industry standard blender/food processor thus powering the present invention. The second eccentric disk 11 is rotationally engaged in between the left rail 19 and the right rail 20 as an outer lateral wall of the second eccentric disk 11 applies outward pressure to the left rail 19 and the right rail 20 thus initiating side-to-side movement of the holder 25.

Figure 10:
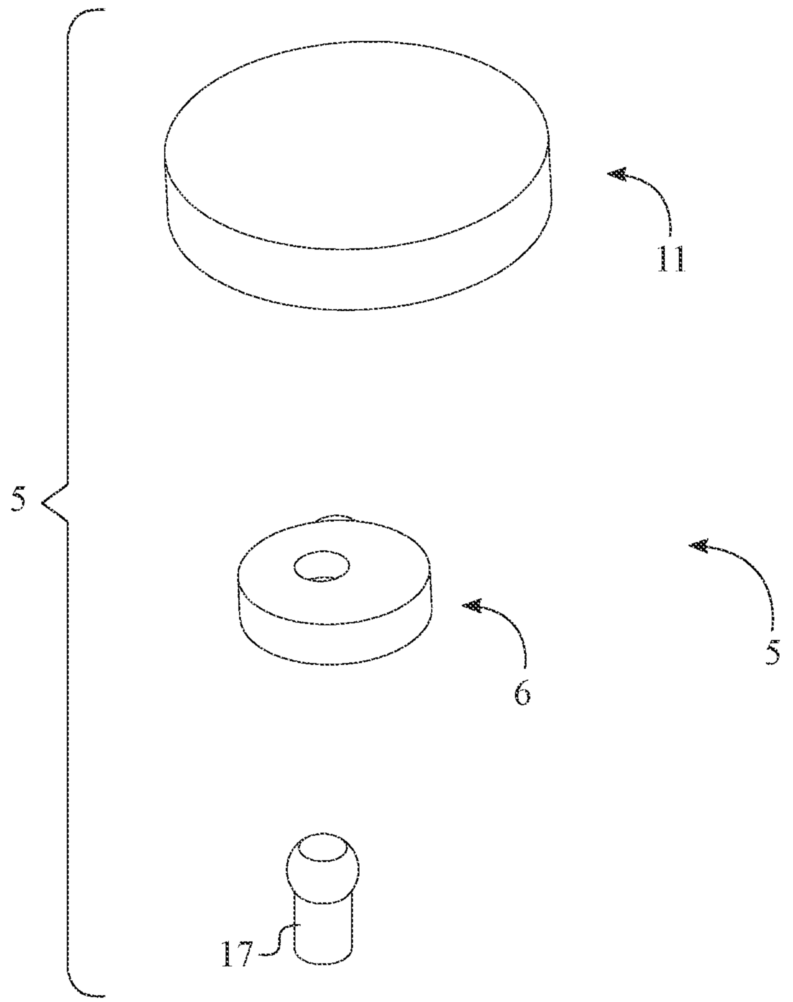
FIG. 10 is a top exploded view of the rotary drive unit of the present invention.
Figure 11:
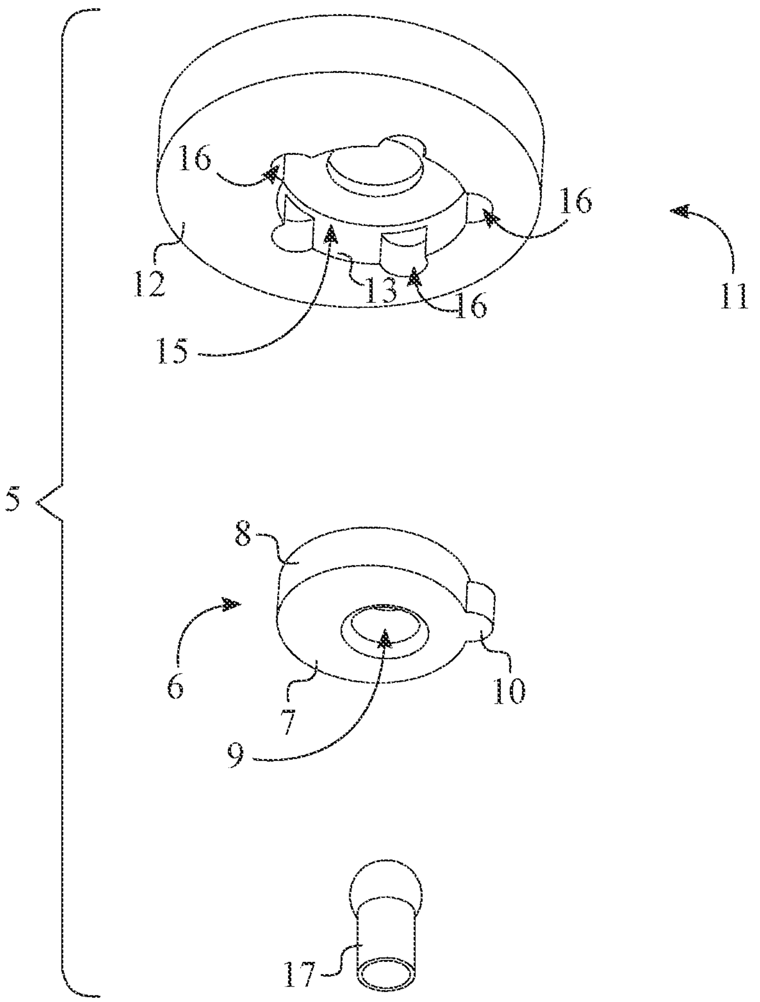
FIG. 11 is a bottom exploded view of the rotary drive unit of the present invention.

In reference to FIG. 10 and FIG. 11, the first eccentric disk 6 is a circular body that may comprise a first disk-body 7, a first hole 9, and a tooth 10. The second eccentric disk 11 is also a circular body that may comprise a second disk-body 12, the second hole 15, and a plurality of grooves 16. Furthermore, the overall diameter of the second eccentric disk 11 is greater than the overall diameter of the first eccentric disk 6 so that the first eccentric disk 6 can be positioned within the second eccentric disk 11. More specifically, the first hole 9 eccentrically traverses into the first disk-body 7. The tooth 10 is adjacently connected to an outer lateral wall 8 of the first disk-body 7 and outwardly oriented from the outer lateral wall 8 of the first disk-body 7. The second hole 15 eccentrically traverses into the second disk-body 12 thus allowing the first disk-body 7 to be firmly positioned within the second hole 15. Furthermore, an inner lateral wall 13 of the second disk-body 12 is delineated by the second hole 15 so that the outer lateral wall 8 of the first disk-body 7 can adjacently position within the inner lateral wall 13 of the second disk-body 12. The plurality of grooves 16 radially traverses from the inner lateral wall 13 to the second disk-body 12 and each of the plurality of grooves 16 are configured to receive the tooth 10. In other words, when the first disk-body 7 is positioned within the second hole 15, the tooth 10 can be interchangeably engaged within one of the plurality of grooves 16 in order to lock the first eccentric disk 6 into the second eccentric disk 11. As a result, the rotational energy delivered by the output shaft of the industry standard blender/food processor can be transferred into the second eccentric disk 11 via the pivoting adaptor 17 and the first eccentric disk 6. Since, the plurality of groves is eccentrically positioned with respect to the outer lateral wall of the second disk-body 12, and the pivoting adaptor 17 is eccentrically positioned with respect to the outer lateral wall 8 of first disk-body 7, the user can attain multiple engagement configurations for the first eccentric disk 6 and the second eccentric disk 11. As a result, the user is able to adjust the arc length of the side-to-side movement of the rocking assembly 18.

Figure 5:
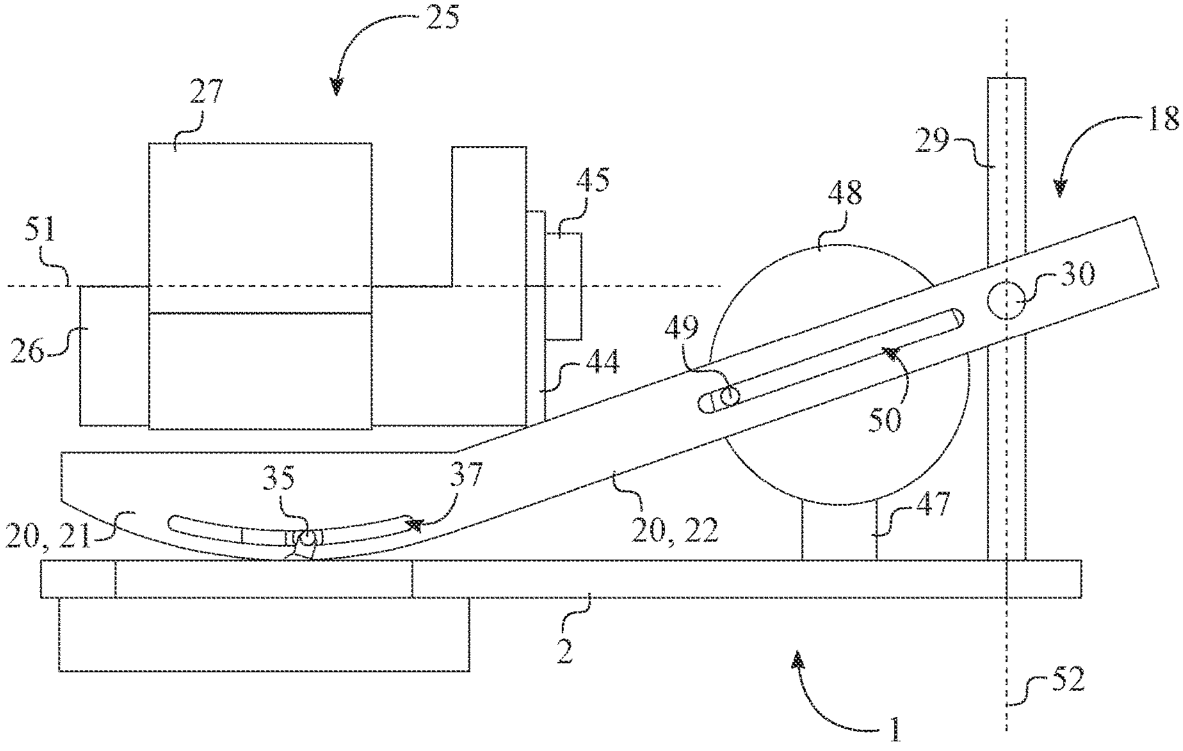
FIG. 5 is a right side view of the present invention.
Figure 6:
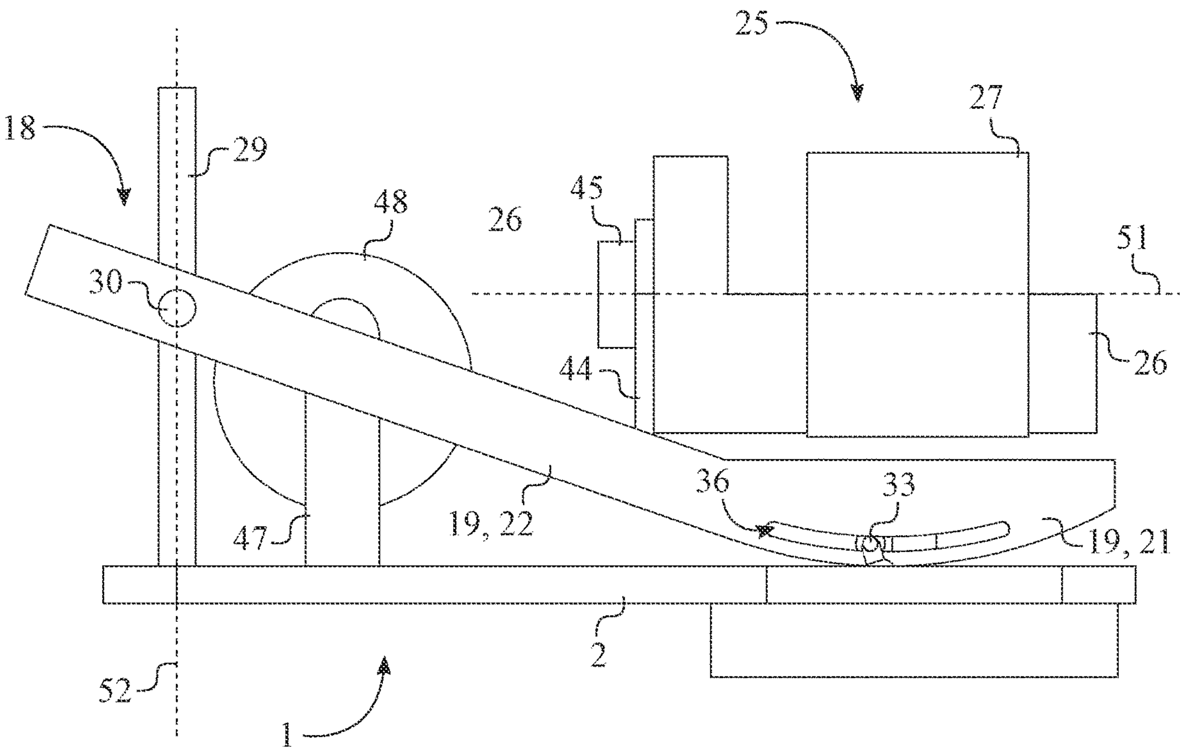
FIG. 6 is a left side view of the present invention.
Figure 9:
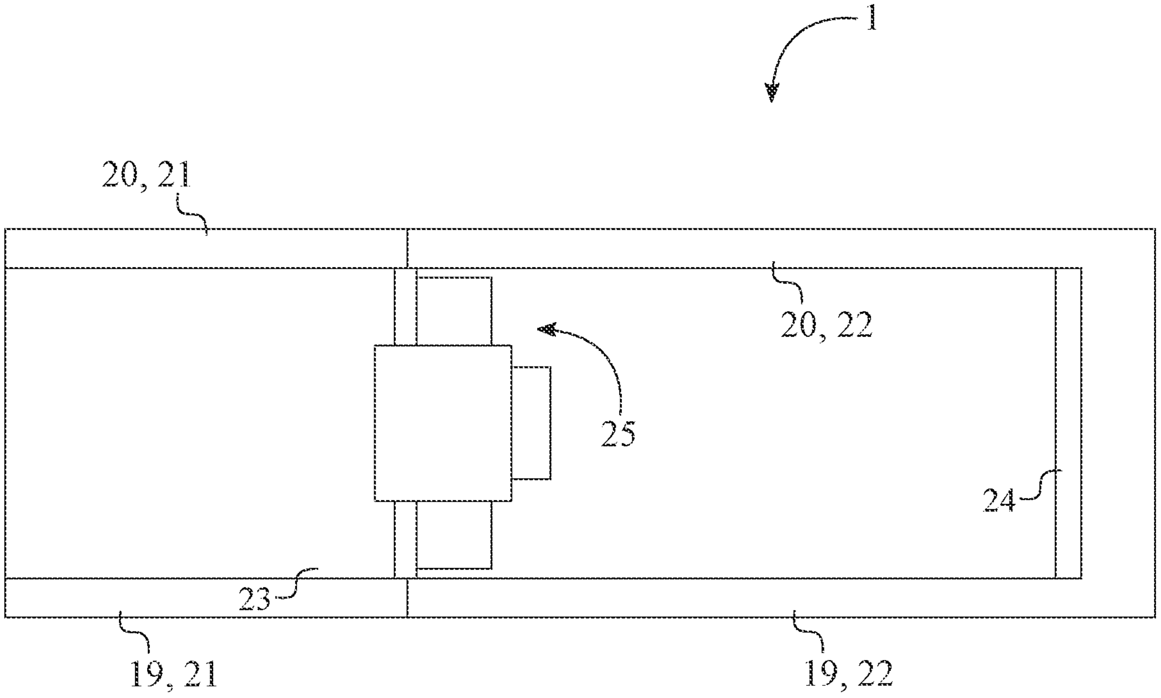
FIG. 9 is a bottom view of the rocking assembly of the present invention.

In reference to FIG. 5, FIG. 6, and FIG. 9, the rocking assembly 18 may further comprise a connector plate 23 and a connector arm 24 to structurally strengthen the rocking assembly 18. The left rail 19 and the right rail 20 are oppositely positioned of each about the connector plate 23 and the connector arm 24 as the connector plate 23 and the connector arm 24 function as the cross members of the rocking assembly 18. More specifically, the connector plate 23 is connected onto the left rail 19 and the right rail 20 so that the parallel distance between the left rail 19 and the right rail 20 can be maintained with respect to a rear end of the rocking assembly 18. The connector arm 24 is connected in between the left rail 19 and the right rail 20 so that the parallel distance between the left rail 19 and the right rail 20 can be maintained with respect to a front end of the rocking assembly 18. In other words, the connector arm 24 and the connector plate 23 are oppositely positioned of each other along the left rail 19 and the right rail 20 thus delineating the general shape of the rocking assembly 18.

In reference to FIG. 5 and FIG. 6, the left rail 19 and the right rail 20 may each comprise a cylindrical segment section 21 and a linear section 22. The cylindrical segment section 21 is adjacently connected to the linear section 22 as the cylindrical segment and the linear section 22 delineate the overall length of the left rail 19 and the right rail 20. The connector plate 23 is connected onto the cylindrical segment section 21 of the left rail 19 and the cylindrical segment section 21 of the right rail 20 and further defines the rear end of the rocking assembly 18. The connector arm 24 is positioned in between the linear section 22 of the left rail 19 and the linear section 22 of the right rail 20 and further defines the front end of the rocking assembly 18. In order to achieve the up and down movement, a bottom surface of the cylindrical segment that is oriented toward the main platform 2 is tangentially positioned with a bottom surface of the linear section 22 that is oriented towards the main platform 2. More specifically, when the rocking assembly 18 is moveably mounted to the main platform 2, the rear end of the rocking assembly 18 is positioned atop the main platform 2 thus allowing the bottom surface of the cylindrical segment to roll back and forth. Then, the front end of the rocking assembly 18 is positioned offset from the main platform 2 as the linear section 22 is angularly oriented with the main platform 2 at an acute angle. Resultantly, the forward movement of the cylindrical segment pushes the linear section 22 towards the main platform 2 and decreases the acute angle, and the backward movement of the cylindrical segment pushes the linear section 22 away from the main platform 2 and increases the acute angle.

Figure 7:
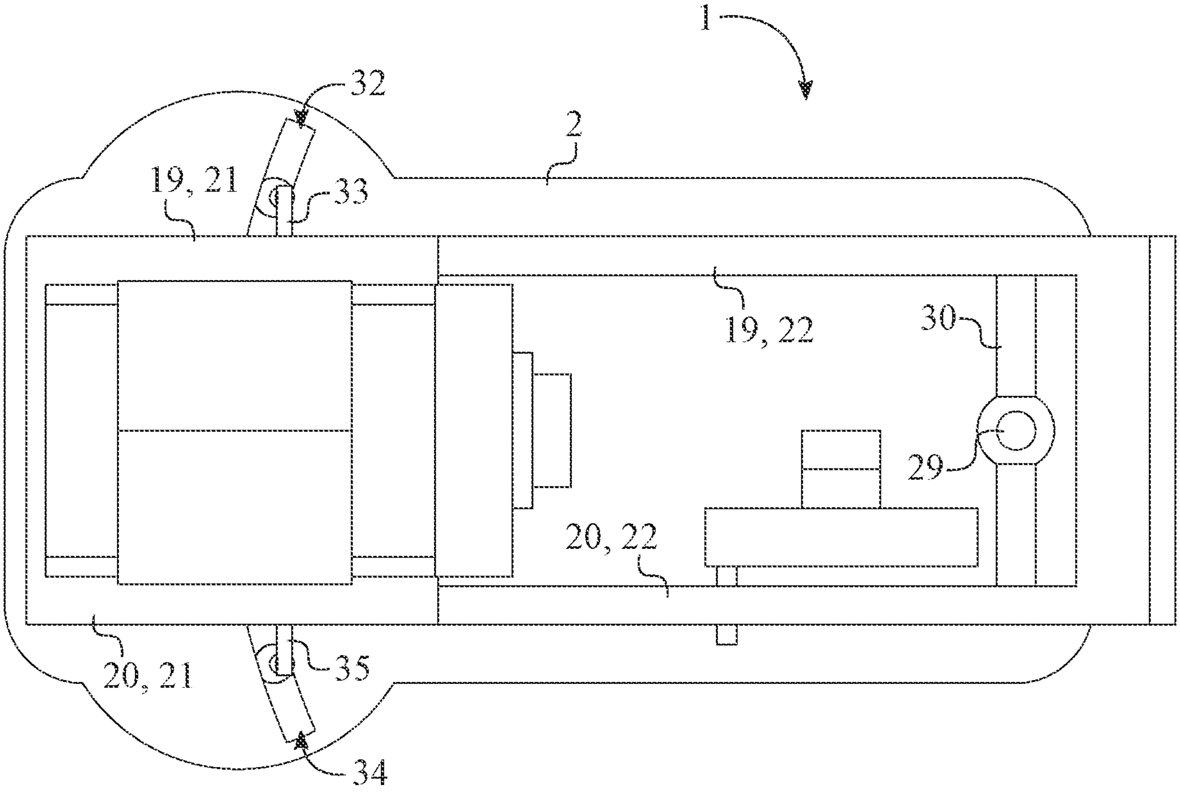
FIG. 7 is a top view of the present invention.

The first stabilizer 28 secures the front end of the rocking assembly 18 and aids the up and down movement of the rocking assembly 18 within the present invention. In reference to FIG. 4, FIG. 5, and FIG. 7, the first stabilizer 28 may comprise a fixed vertical shaft 29 and a pivoting cross-bar 30. The fixed vertical shaft 29 is connected onto the main platform 2 and positioned adjacent to the connector arm 24. Furthermore, the fixed vertical shaft 29 and the opening 4 of the base 1 are positioned opposite of each other about the main platform 2. The pivoting cross-bar 30 is rotatably connected to the linear section 22 of the left rail 19 and the linear section 22 of the right rail 20 and slidably connected to the fixed vertical shaft 29. As a result, when the rocking assembly 18 moves up and down along the second axis 52, the pivoting cross-bar 30 also moves up and down along the fixed vertical shaft 29 thus providing stability to the front end of the rocking assembly 18. Furthermore, the pivoting cross-bar 30 also allows the rocking assembly 18 to move side-to-side as the second axis 52 functions as the center of rotation for the side-to-side movement.

The second stabilizer 31 secures the rear end of the rocking assembly 18 and aids the side-to-side movement of the rocking assembly 18 within the present invention. In reference to FIG. 3 and FIGS. 5-7, the second stabilizer 31 may comprise a left radial-channel 32, a left locking pin 33, a right radial-channel 34, a right locking pin 35, a left curved-channel 36, and a right curved-channel 37. The left radial-channel 32 traverses into the main platform 2 and is positioned adjacent to the left rail 19. The right radial-channel 34 traverses into the main platform 2 and is positioned adjacent to the right rail 20. The left radial-channel 32 and the right radial-channel 34 are oppositely positioned of each other about the opening 4 of the base 1. The left curved-channel 36 traverses through the cylindrical segment section 21 of the left rail 19. The right curved-channel 37 traverses through the cylindrical segment section 21 of the right rail 20. The left locking pin 33 is slidably engaged within the left radial-channel 32 and the left curved-channel 36 so that the left rail 19 can be secured to the main platform 2 while permitting the side-to-side movement. The right locking pin 35 is slidably engaged within the right radial-channel 34 and the right curved-channel 37 so that the right rail 20 can be secured to the main platform 2 while permitting the side-to-side movement. As a result, the second stabilizer 31 is able to maintain the rear end of rocking assembly 18 atop the main platform 2 without impeding the side-to-side movement of the rocking assembly 18.

Figure 4:
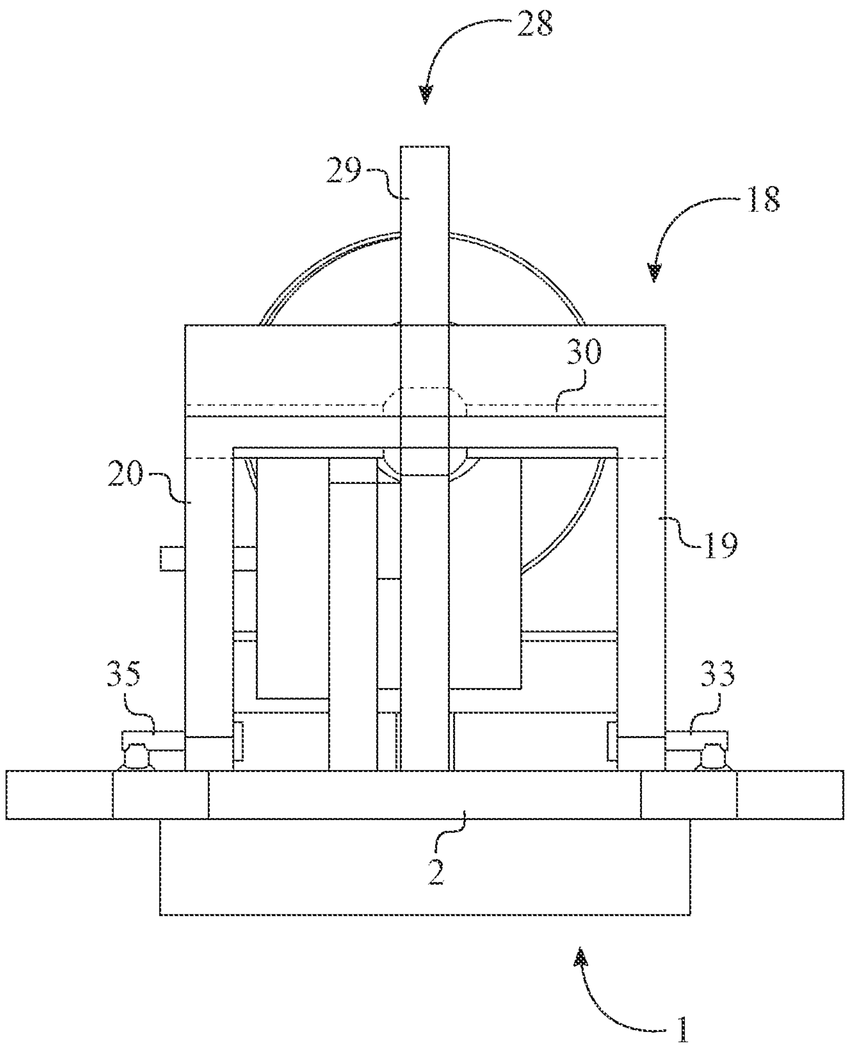
FIG. 4 is a front view of the present invention.

In reference to FIG. 1, FIG. 4, and FIG. 5, the holder 25 may comprise a cradle 26 and an adjustable locking strap 27. The cradle 26 is a cylindrical structure and rotatably mounted to the connector plate 23 of the rocking assembly 18. More specifically, the cradle 26 is able to concentrically rotate 360-degrees around the first axis 51 so that the storage container can also be rotated 360-degrees around the first axis 51. The adjustable locking strap 27 is connected to the cradle 26 so that the storage container can be secured to the holder 25. As a result, the storage container and the holder 25 are able to simultaneously rotates around the first axis 51.

Figure 12:
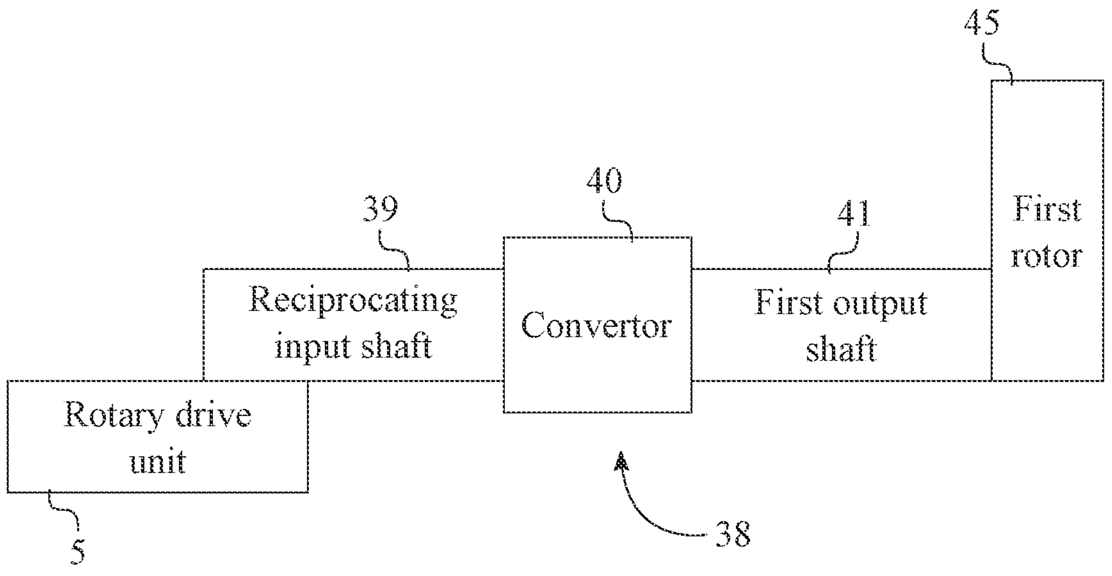
FIG. 12 is a schematic view showing the energy transformation from the rotary drive unit to the first rotational mechanism through the first rotational mechanism.

In reference to the first rotational mechanism 43 that rotates the holder 25 360-degrees around the first axis 51, the transmission unit 38 may comprise at least one reciprocating input shaft 39, a convertor 40, and a first output shaft 41 as shown in FIG. 12. The first rotational mechanism 43 may comprise a first support 44 and a first rotor 45 as shown in FIG. 5 and FIG. 6. The cradle 26 is rotatably mounted to the connector plate 23 by the first support 44 so that the cradle 26 can be positioned atop the connector plate 23 and can rotate freely. The first rotor 45 is rotatably engaged with the cradle 26 through the first support 44 so that the first rotor 45 can function as the intermediate coupler that transfers the rotational energy of the transmission unit 38 to the rotational energy of the cradle 26. More specifically, the at least one reciprocating input shaft 39 is rotatably engaged with the rotary drive unit 5 thus transferring the rotational energy of the rotary drive unit 5 into the transmission unit 38. The first output shaft 41 is operatively coupled with the at least one reciprocating input shaft 39 through the convertor 40, wherein the convertor 40 transfers the rotational energy of the at least one reciprocating input shaft 39 into the rotational energy of the first output shaft 41. The convertor 40 can include, but is not limited to a gearbox, a ratchet pawl system, a spring-loaded system, or any types of mechanical unit is capable of transferring rotational energy within the art. The first output shaft 41 is rotatably engaged with the first rotor 45, wherein the rotational energy of the first output shaft 41 simultaneously rotates the first rotor 45 and the cradle 26.

Figure 13:
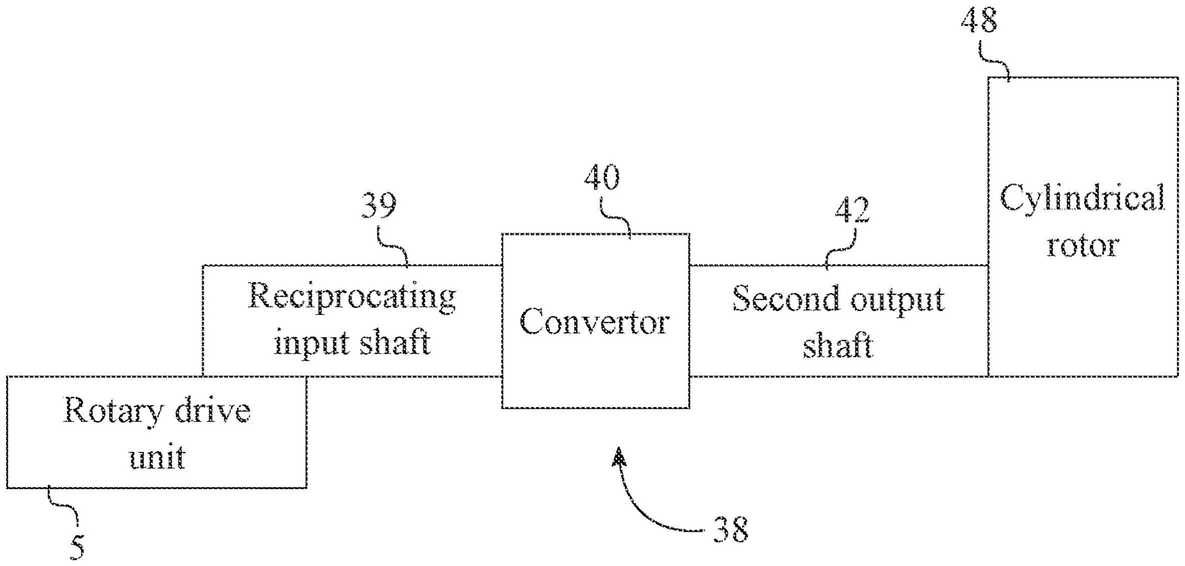
FIG. 13 is a schematic view showing the energy transformation from the rotary drive unit to the first rotational mechanism through the second rotational mechanism.

In reference to the second rotational mechanism 46 that rotates the rocking assembly 18 up and down along the second axis 52, the transmission unit 38 may comprise the at least one reciprocating input shaft 39, the convertor 40, and a second output shaft 42 as shown in FIG. 13. The second rotational mechanism 46 may comprise a second support 47, a cylindrical rotor 48, an eccentric pin 49, and a linear channel 50 as shown in FIG. 5 and FIG. 6. The second support 47 is connected onto the main platform 2 and positioned adjacent to the connector arm 24. The cylindrical rotor 48 is rotatably connected to the second support 47 as the cylindrical rotor 48 is positioned offset to the main platform 2 and in between the left rail 19 and the right rail 20. The eccentric pin 49 is connected onto the cylindrical rotor 48 and positioned offset from the center point of the cylindrical rotor 48. The linear channel 50 traverses through the right rail 20 thus allowing the eccentric pin 49 to be slidably engaged within the linear channel 50. It is also understood that the linear channel 50 can traverse through the left rail 19, and the eccentric pin 49 can slidably engage within the linear channel 50 within the left rail 19 without deviating from the scope of the functionality. More specifically, the at least one reciprocating input shaft 39 is rotatably engaged with the rotary drive unit 5 thus transferring the rotational energy of the rotary drive unit 5 into the transmission unit 38. The second output shaft 42 is operatively coupled with the at least one reciprocating input shaft 39 through the convertor 40, wherein the convertor 40 transfers the rotational energy of the at least one reciprocating input shaft 39 into the rotational energy of the second output shaft 42. The convertor 40 can include, but is not limited to a gearbox, a ratchet pawl system, a spring-loaded system, or any types of mechanical unit is capable of transferring rotational energy within the art. The second output shaft 42 is rotatably engaged with the cylindrical rotor 48, wherein the rotational energy of the second output shaft 42 simultaneously rotates the cylindrical rotor 48. Due to the engagement between the eccentric pin 49 and the linear channel 50, the front end of the rocking assembly 18 is able to move up and down along the second axis 52.

In reference to FIG. 5 and FIG. 6, the first axis 51 is concentrically positioned to the first rotor 45 as the cradle 26 is concentrically rotated about the first axis 51. The second axis 52 is concentrically positioned along the fixed vertical shaft 29 as the pivoting cross-bar 30 is slidably engaged along the second axis 52 to implement up and down movement, and the rocking assembly 18 is radially engaged around the second axis 52 to implement side-to-side movement.

Although the invention has been explained in relation to its preferred embodiment, it is to be understood that many other possible modifications and variations can be made without departing from the spirit and scope of the invention as hereinafter claimed.

What is claimed is:

1. A nut butter mixing apparatus comprising:
- a base;
- a rotary drive unit;
- a rocking assembly;
- a holder;
- a first stabilizer;
- a second stabilizer;
- the base comprising an opening;
- the rotary drive unit comprising a first eccentric disk, a second eccentric disk, and a pivoting adaptor;
- the rocking assembly comprising a left rail and a right rail;
- the rocking assembly being moveably mounted to the base by the first stabilizer and the second stabilizer;
- the rotary drive unit being rotationally engaged in between the left rail and the right rail through the base, wherein the rotary drive unit radially moves the rocking assembly; and
- the holder being rotatably mounted to the rocking assembly,
- the first eccentric disk being removably engaged within the second eccentric disk;
- the pivoting adaptor being pivotably connected to the first eccentric disk;
- the pivoting adaptor traversing through the opening; and
- the second eccentric disk being rotationally engaged in between the left rail and the right rail.

2. The nut butter mixing apparatus as claimed in claim 1 comprising:
- the base comprising a main platform and a supporting ring;
- the opening traversing through the main platform;
- the supporting ring being terminally connected to the main platform; and
- the supporting ring being concentrically positioned around the opening.

3. The nut butter mixing apparatus as claimed in claim 1 comprising:
- the first eccentric disk comprising a first disk-body, a first hole, and a tooth;
- the second eccentric disk comprising a second disk-body, a second hole, and a plurality of grooves;
- the first hole eccentrically traversing into the first disk-body;
- the tooth being adjacently connected to an outer lateral wall of the first disk-body;
- the second hole eccentrically traversing into the second disk-body;
- an inner lateral wall of the second disk-body being delineated by the second hole;
- the plurality of grooves radially traversing from the inner lateral wall to the second disk-body;
- the first disk-body being positioned within the second hole; and
- the tooth being interchangeably engaged within one of the plurality of grooves.

4. The nut butter mixing apparatus as claimed in claim 1 comprising:
- the rocking assembly further comprising a connector plate and a connector arm;
- the left rail and the right rail being oppositely positioned of each about the connector plate and the connector arm;
- the connector plate being connected onto the left rail and the right rail;
- the connector arm being connected in between the left rail and the right rail; and
- the connector arm and the connector plate being oppositely positioned of each other along the left rail and the right rail.

5. The nut butter mixing apparatus as claimed in claim 4 comprising:
- the left rail and the right rail each comprising a cylindrical segment section and a linear section;
- the cylindrical segment section being adjacently connected to the linear section;
- the connector plate being connected onto the cylindrical segment section of the left rail and the cylindrical segment section of the right rail; and
- the connector arm being connected in between the linear section of the left rail and the linear section of the right rail.

6. The nut butter mixing apparatus as claimed in claim 1 comprising:
- the first stabilizer comprising a fixed vertical shaft and a pivoting cross-bar;
- the left rail and the right rail each comprising a linear section;
- the fixed vertical shaft being connected onto a main platform of the base;
- the fixed vertical shaft and the opening being oppositely positioned of each other about the main platform;
- the pivoting cross-bar being rotatably connected to the linear section of the left rail and the linear section of the right rail; and
- the pivoting cross-bar being slidably connected to the fixed vertical shaft.

7. The nut butter mixing apparatus as claimed in claim 6 comprising:
- a second axis;
- the second axis being concentrically positioned along the fixed vertical shaft;
- the pivoting cross-bar being slidably engaged along the second axis; and
- the rocking assembly being radially engaged around the second axis.

8. The nut butter mixing apparatus as claimed in claim 1 comprising:
- the second stabilizer comprising a left radial-channel, a left locking pin, a right radial-channel, a right locking pin, a left curved-channel, and a right curved-channel;
- the left rail and the right rail each comprising a cylindrical segment section;
- the left radial-channel traversing into a main platform of the base;
- the right radial-channel traversing into the main platform;
- the left radial-channel and the right radial-channel being oppositely positioned of each other about the opening;
- the left curved-channel traversing through the cylindrical segment section of the left rail;
- the right curved-channel traversing through the cylindrical segment section of the right rail;
- the left locking pin being slidably engaged within the left radial-channel and the left curved-channel; and the right locking pin being slidably engaged within the right radial-channel and the right curved-channel.

9. The nut butter mixing apparatus as claimed in claim 1 comprising:

the holder comprising a cradle and an adjustable locking strap;

the cradle being rotatably mounted to a connector plate of the rocking assembly; and the adjustable locking strap being connected to the cradle.

10. The nut butter mixing apparatus as claimed in claim 1 comprising:

a transmission unit;

a first rotational mechanism; and the first rotational mechanism being operatively coupled to the rotary drive unit through the transmission unit, wherein the first rotational mechanism rotates the holder.

11. The nut butter mixing apparatus as claimed in claim 10 comprising:

the transmission unit comprising at least one reciprocating input shaft, a convertor, and a first output shaft;

the first rotational mechanism comprising a first support and a first rotor;

a cradle of the holder being rotatably mounted to a connector plate of the rocking assembly by the first support;

the first rotor being rotatably engaged with the cradle through the first support;

the at least one reciprocating input shaft being rotatably engaged with the rotary drive unit;

the first output shaft being operatively coupled with the at least one reciprocating input shaft through the convertor, wherein the convertor transfers the rotational energy of the at least one reciprocating input shaft into the rotational energy of the first output shaft; and the first output shaft being rotatably engaged with the first rotor, wherein the rotational energy of the first output shaft rotates the first rotor.

12. The nut butter mixing apparatus as claimed in claim 11 comprising:

a first axis;

the first axis being concentrically positioned to the first rotor of the first rotational mechanism; and the cradle of the holder being concentrically rotated about the first axis.

13. The nut butter mixing apparatus as claimed in claim 1 comprising:

a transmission unit;

a second rotational mechanism; and the second rotational mechanism being operatively coupled to the rotary drive unit through the transmission unit, wherein the second rotational mechanism angularly moves the rocking assembly.

14. The nut butter mixing apparatus as claimed in claim 13 comprising:

the transmission unit comprising at least one reciprocating input shaft, a convertor, and a second output shaft;

the second rotational mechanism comprising a second support, a cylindrical rotor, an eccentric pin, and a linear channel;

the second support being connected onto a main platform of the base;

the second support being positioned adjacent to a connector arm of the rocking assembly;

the cylindrical rotor being rotatably connected to the second support;

the cylindrical rotor being positioned offset to the main platform;

the eccentric pin being connected onto the cylindrical rotor;

the linear channel traversing through the right rail;

the eccentric pin being slidably engaged within the linear channel;

the at least one reciprocating input shaft being rotatably engaged with the rotary drive unit;

the second output shaft being operatively coupled with the at least one reciprocating input shaft through the convertor, wherein the convertor transfers the rotational energy of the at least one reciprocating input shaft into the rotational energy of the second output shaft; and the second output shaft being rotatably engaged with the cylindrical rotor, wherein the rotational energy of the second output shaft rotates the cylindrical rotor.

* * * * *